United States Patent
Scrosati et al.

(10) Patent No.: US 9,991,558 B2
(45) Date of Patent: Jun. 5, 2018

(54) RECHARGEABLE ELECTROCHEMICAL METAL ION CELL AND ACCUMULATOR CONTAINING SAID CELL

(71) Applicants: SB SOLAR, Verolanuova (IT); UNIVERSITA' DEGLI STUDI DI ROMA "LA SAPIENZA", Rome (IT)

(72) Inventors: Bruno Scrosati, Rome (IT); Jusef Hassoun, Latina (IT)

(73) Assignees: SB SOLAR, Verolanuova (BS) (IT); UNIVERSITA' DEGLI DI ROMA, Rome (IT)

( * ) Notice: Subject to any disclaimer, the term of this patent is extended or adjusted under 35 U.S.C. 154(b) by 0 days. days.

(21) Appl. No.: 15/327,111

(22) PCT Filed: Mar. 31, 2015

(86) PCT No.: PCT/IT2015/000091
§ 371 (c)(1),
(2) Date: Jan. 18, 2017

(87) PCT Pub. No.: WO2015/159313
PCT Pub. Date: Oct. 22, 2015

(65) Prior Publication Data
US 2017/0214085 A1    Jul. 27, 2017

(30) Foreign Application Priority Data
Apr. 18, 2014   (IT) .............................. CR2014A0012

(51) Int. Cl.
H01M 10/0565    (2010.01)
H01M 10/0525    (2010.01)
(Continued)

(52) U.S. Cl.
CPC ....... H01M 10/0565 (2013.01); H01M 4/131 (2013.01); H01M 4/134 (2013.01);
(Continued)

(58) Field of Classification Search
CPC ......... H01M 10/0525; H01M 10/0565; H01M 4/131; H01M 4/134; H01M 4/505; H01M 4/525; H01M 4/5825
See application file for complete search history.

(56) References Cited

PUBLICATIONS

Jing Yan et al: "Rechargeable hybrid aqueous batteries", Journal of Power Sources, Elsevier SA, CH, vol. 216, May 18, 2012 (May 18, 2012), pp. 222-226, Ontario, Canada, XP028411861.
(Continued)

*Primary Examiner* — Brittany L Raymond
(74) *Attorney, Agent, or Firm* — Young & Thompson

(57) ABSTRACT

A rechargeable electrochemical metal ion cell includes negative and positive electrodes, and an electrolyte system between them. The negative electrode includes a metal capable of releasing and accepting metal ions. The positive electrode includes at least one compound capable of releasing and accepting metal ions different from those of the negative electrode. The electrolyte system includes: a glycol-based electrolyte solution containing a salt of a metal included in the negative electrode and a salt of a metal included in the positive electrode; a matrix adapted to retain the electrolyte solution, where two reversible reactions take place simultaneously in the cell: a reversible deposition and dissolution process of ions of a metal included in the negative electrode takes place in the negative electrode and a reversible ion exchange process of a metal included in the positive electrode takes place in the positive electrode. The metals are different from one another.

20 Claims, 4 Drawing Sheets
(3 of 4 Drawing Sheet(s) Filed in Color)

(51) Int. Cl.
*H01M 4/131* (2010.01)
*H01M 4/134* (2010.01)
*H01M 4/505* (2010.01)
*H01M 4/525* (2010.01)
*H01M 4/58* (2010.01)

(52) U.S. Cl.
CPC .......... *H01M 4/505* (2013.01); *H01M 4/525* (2013.01); *H01M 4/5825* (2013.01); *H01M 10/0525* (2013.01); *H01M 2300/0082* (2013.01); *H01M 2300/0085* (2013.01)

(56) References Cited

PUBLICATIONS

Jun et al: "Zinc Polymer Gel Electrolytes Based on Oligomeric Polyethers and Ionic Liquids", 207th ECS Meeting. Abstract #116. copyright ECS 207th ECS Meeting. Abstract. May 16, 2005 (May 16, 2005). XP055160748, New Jersey, USA.

Baihe Zhang et al: "An aqueous rechargeable battery based on zinc anode and NaO.95MnO2", Chemical Communications, vol. 50. No. 10. Nov. 25, 2013 (Nov. 25, 2013). p. 1209, Hunan, China, XP055160254.

M. Umebayashi et al: "Aqueous Lithium Ion-Zinc Secondary Battery", Jul. 5, 2008 (Jul. 5, 2008). Kofu, Japan, XP055160694. Retrieved from the Internet: URL:http://ma.ecsdl.org/content/MA2008-02/ 1/35.full.pdf.

Takegami et al: "Aqueous Lithium Ion-Zinc Secondary Battery", Electrochemistry, Electrochemical Society of Japan. JP, No. 10, Jan. 1, 2006 (Jan. 1, 2006). pp. 825-827, Kofu, Japan, XP008163301. ISSN: 1344-3542.

Zhang S. S. et al: "A Novel Electrolyte Solvent for Rechargeable Lithium and Lithium-Ion Batteries", Journal of the Electrochemical Society, Electrochemical Society, vol. 143. No. 12, Dec. 1, 1996 (Dec. 1, 1996). pp. 4047-4053. Arizona, USA, XP002064729.

Hao-Yiang Wu et al: "Synthesis and characterization of highly conductive plasticized double core organic-inorganic hybrid electrolytes for lithium polymer batteries" Journal of Power Sources, Elsevier SA. CH. vol. 238, Mar. 26, 2013 (Mar. 26, 2013). pp. 265-273, Taipei, Taiwan, XP028554475.

International Search Report dated Sep. 4, 2015, in corresponding PCT application.

RECHARGEABLE ELECTROCHEMICAL METAL ION CELL AND ACCUMULATOR CONTAINING SAID CELL

FIELD OF THE INVENTION

The present invention relates to the field of electrical energy accumulators, or secondary batteries, or more commonly rechargeable batteries.

More in particular it relates to a rechargeable electrochemical cell of the type with metal ions, adapted to be used to produce metal ion accumulators with innovative features with respect to the background art.

BACKGROUND ART

A battery is a device in which chemical energy is stored; this energy is then supplied, on demand, as electrical energy, to operate devices during a given period of time, for example to supply electronic devices or electric motors, in particular for means of transport and motor cars.

A battery is generally constituted by one or more electrochemical cells, each of which contains a cathode (positive electrode), an anode (negative electrode) and an electrolyte system.

Rechargeable batteries, also called electrical energy accumulators or secondary batteries, are electrochemical devices in which chemical energy is converted into electrical energy and vice versa, with a charge that can be restored through the application of suitable electrical energy from an external source. These batteries include, for example, Lead-Acid, Nickel-Cadmium, Nickel-Metal Hydride, Alkaline and Lithium Ion batteries.

In particular, lithium ion batteries are characterized by high specific energy, high efficiency, no "memory effect", and by high usage time. These properties, peculiar to lithium ion batteries, have made them particularly popular for mobile electronic consumer goods, such as cellular telephones, portable computers, digital cameras, MP3 players, etc.

A schematic illustration of the charging and discharging processes that take place in a conventional cell is shown in FIG. 1 (prior art).

The most conventional composition of a lithium-ion battery includes an anode 100 (negative electrode) based on graphite 101, a cathode 200 (positive electrode) based on a lithium metal oxide, generally lithium cobalt oxide, $LiCoO_2$, where anode and cathode are separated by an electrolyte system 300 composed of a solution of a lithium salt, generally lithium hexafluorophosphate, $LiPF_6$, in a mixture of aprotic organic solvents, prevalently ethylene carbonate and dimethyl carbonate.

Conventional lithium ion batteries are charged and discharged through the reversible transport of lithium ions $Li^+$, in the organic electrolyte medium, between the anode and the cathode, with consequent electron exchange. In particular, the ions move from the anode to the cathode during discharging and from the cathode to the anode during charging. It must be noted that only the lithium ions $Li^+$ participate in the charge/discharge reactions.

To ensure development of the lithium-ion battery technology, also in view of application in emerging markets, such as accumulation in power plants based on discontinuous sources (for example solar and/or wind energy) and sustainable road transport with electric and/or hybrid cars, it is necessary to renew the electrochemical system of these batteries in order to increase their energy content and safety level and to decrease their cost.

Among the alternative cathode materials to conventional $LiCoO_2$, compounds of the type $LiM_1M_2O_4$ are known, where $M_1$ and $M_2$ are metals selected from Mn, Ni, Fe, Co, P or combinations thereof. Classic examples are nickel manganese spinel $LiNi_{0.5}Mn_{1.5}O_4$ and lithium iron phosphate $LiFePO_4$. With regard to the alternative anode materials to graphite, compounds formed of lithium alloys, such as $Li_xSn$, $Li_xSi$, $Li_xSb$, are known.

Moreover, electrolyte systems alternative to liquid organic systems are also known, such as room temperature molten salts (ionic liquids) like those based on pyrrolidinium or solid or gel polymers such as those based on polyethylene oxide (PEO) or polyvinylidene fluoride (PVdF).

However, also in these cases, the electrolyte systems embed a single metal ion, which is the only one to be involved in the electrochemical process.

The prior art concerning materials for lithium ion accumulators refers prevalently to their use in conventional systems, both for the use of the electrolyte (organic liquid solutions or polymers) and of the anode material (graphite or others). However, these systems are disadvantageously characterized by the presence of inflammable organic materials (electrolytes) that cause operating risks (safety of the battery) and high costs associated both with the processing of prototypes and with their operation. The preparation of prototypes must in fact be performed in extremely controlled environments in terms of humidity and oxygen content, which must be maintained at levels of a few parts per million.

Their operation is influenced by an extreme sensitivity to atmospheric agents, which can cause fires and, in extreme conditions, also explosions. Further factors that influence the costs are associated with the production of solvents and organic electrolytes commonly used in commercial lithium ion batteries, and with the need to use complex electronic systems (for example BMS, battery management systems) to control charging of the single cells and simultaneous equalization of several cells.

The main disadvantage of current lithium ion batteries therefore resides in the electrolyte system used.

Moreover, current technology does not allow the production of lithium ion batteries of large dimensions which are also safe, suitable to store large quantities of energy, capable of compensating for the difference in demand for energy of electricity networks between day and night. This is due to the high reactivity of the common organic electrolytes with the materials of which the electrodes are made, which causes serious safety problems, in particular in reproducing lithium ion batteries with large dimensions.

The document TAKEGAMI ET AL: "Aqueous Lithium Ion-Zinc Secondary Battery", KÔEN-YÔSHISHÛ, DENKI-KAGAKKAI-74.-TAIKAI: KÔFU, Mar. 29-31, 2008, ELECTROCHEMICAL SOCIETY OF JAPAN, JP, no. 10, 1 Jan. 2006 (2006 Jan. 1), pages 825-827, XP008163301, ISSN: 1344-3542 discloses a rechargeable electrochemical cell composed of two coupled independent half-cells (anode and cathode system), wherein the side of the negative electrode (Zn) and the side of the positive electrode ($LiMn_2O_4$) are physically separated. The two half-cells are in fact characterized respectively by different acidic and basic conditions, i.e. by different pH, which makes their mutual separation essential.

In particular, separation is obtained by means of a separator made of nonwoven fabric in polyester fiber and plastic material.

OBJECT OF THE INVENTION

The object of the present invention is that of overcoming the aforesaid negative points and obtaining an absolute improvement in terms of safety, operation and a noteworthy decrease in costs.

This improvement is obtained through the simultaneous replacement of the aprotic organic electrolytes currently used with a glycol-based electrolyte system, in particular comprising a solid and/or polymer and/or gel medium that greatly retains the aforesaid glycol-based electrolyte solution, and the replacement of the lithium based negative electrode with one based on an air stable metal without further protection. These modifications imply a radical change both from the point of view of the reaction mechanism (hereinafter defined hybrid, as it simultaneously involves ions of different nature) and from the point of view of manufacturing (concerning production and assembly of the cell).

A further object is that of producing a new type of metal ion electrical energy accumulator (rechargeable battery), so that it is suitable for accumulating energy to be used subsequently, for example in eco-sustainable systems such as power plants based on discontinuous sources (solar and/or wind) and sustainable road transport, for example with electric and/or hybrid cars.

The objects are achieved with a rechargeable electrochemical metal ion cell comprising:
a negative electrode (anode);
a positive electrode (cathode);
an electrolyte system interposed between said negative electrode and said positive electrode,
characterized in that:
said negative electrode comprises at least one metal capable of releasing and accepting metal ions;
said positive electrode comprises at least one compound capable of releasing and accepting metal ions different from those of the negative electrode;
said electrolyte system comprises:
a glycol-based electrolyte solution based on a salt of a metal included in the negative electrode and on a salt of a metal included in the positive electrode;
a matrix of solid and/or polymer and/or gel type adapted to retain said electrolyte solution,
where two reversible reactions take place simultaneously in said cell: a reversible deposition and dissolution process of ions of a metal included in the negative electrode takes place in said negative electrode and a reversible ion exchange process of a metal included in the positive electrode takes place in said positive electrode and said metals are different from one another.

Advantageously, the glycol-based solution guarantees increased solvent power to many salts, much greater than aprotic organic solvents in use, and also exhibits a high electrolyte conductivity and adequate ion transfer number. These requirements are essential to guarantee satisfactory use of the electrodes, adequate response to increasing currents and high energy density.

The hybrid cell proposed herein operates with a relatively low voltage compared to known lithium- or zinc-based systems with aprotic electrolytes or polyether-based systems (e.g. PEGDME). The lithium cells generally operate between 3V and 4V, while the cell of the invention operates between 1V and 2V. This relatively low operating voltage is offset by specific properties that characterize the type of cells described herein, such as high electrolyte conductivity, ion transfer number that allows adequate electrochemical response to increasing currents and low polarization value. These properties are guaranteed in the proposed system through the combination of the electrodes selected with the glycol-based electrolyte system.

Further characteristics of the invention are contained in the dependent claims.

ADVANTAGES OF THE INVENTION

Unlike prior art metal ion cells, the cell of the present invention simultaneously exploits two different reversible reactions, namely the reversible reaction that causes the exchange of a metal ion belonging to the positive electrode, for example as occurs in conventional lithium ion cells, and the reversible reaction of deposition and of dissolution of ions of a metal different from the previous metal belonging to the negative electrode, contrary to what occurs in the negative electrode of lithium cells where the exchanged ion is the same as the cathode.

The two aforesaid reversible reactions are made possible, as well as by the nature of the anode and of the cathode, by an innovative electrolyte system, based on a glycol-based medium, containing two salts, a salt of the metal belonging to the cathode, and a salt of the metal belonging to the anode. This metal salt enables the negative electrode to use the reversible deposition and dissolution process of said metal.

The advantage of this glycol-based electrolyte system lies in the fact that it is not necessary to physically separate the anode side from the cathode side, but the electrolyte system provides for the simultaneous presence, in the same fixing matrix, of two different metal ions, that move independently in two different directions respectively during the charging and discharging step.

Further advantages of the glycol-based electrolyte are low freezing point and high boiling point, which enable a wide temperature window in which it can be used, in particular if compared to conventional solvents and water.

As it is known, glycol is not inflammable and makes it possible to work in conditions of greater safety, compared to the use of other organic solvents, both during assembly of the cells and during their operation. Moreover, glycol allows cells that operate with a high level of efficiency, even at low temperatures. Another advantage of the glycol-based electrolyte is the wide electrochemical stability window, particularly compared to water.

The aforesaid innovative electrolyte system comprises a support in solid and/or polymer and/or gel state, originally solvated by means of a glycol solution containing the two salts, which is retained by this support.

In the text of the description, the electrolyte is defined "hybrid" as it simultaneously allows an anodic reaction and a cathodic reaction that involve two types of metal ions different from one another, so that the single ion does not pass from the anode to the cathode and vice versa, unlike in the case, for example, of lithium ion cells and in general in metal ion transport cells of conventional type.

The technical solutions proposed in this patent, aimed at simplifying the configuration of the battery with the associated variations in the electrolyte, in the anode and cathode compartment, represent a radical change in the technology of metal ion batteries, obtaining the following advantages:
making it possible to produce, in industrial plants, cells that are less complex than current cells (which require very strict control of environmental conditions) with an expected drastic reduction in production costs;

raising the safety level due to the absence of inflammable liquids and consequently reducing operating and using risks;

avoiding the use of costly, complex and somewhat unreliable systems for control and equalization of charging and discharging (BMS), given that the nature of the electrolyte leads to extremely limited and reversible phenomena of decomposition.

In this regard it must be underscored that, unlike aqueous electrolytes, any degradation processes of an oxidative or reductive nature of the glycol electrode do not lead to the generation of hydrogen or oxygen which, being highly reactive species, could create safety problems.

The above-listed factors provide the basis for ensuring a high level of competitiveness in the energy storage market of rechargeable batteries containing these electrochemical cells.

BRIEF DESCRIPTION OF THE DRAWINGS

The patent or application file contains at least one drawing executed in color. Copies of this patent or patent application publication with color drawings will be provided by the Patent and Trademark Office upon request and payment of the necessary fee.

The advantages of the present invention will become more apparent from the following descriptions of preferred embodiments thereof, which are illustrated by way of non-limiting example in the accompanying drawings, in which.

Figure 1:
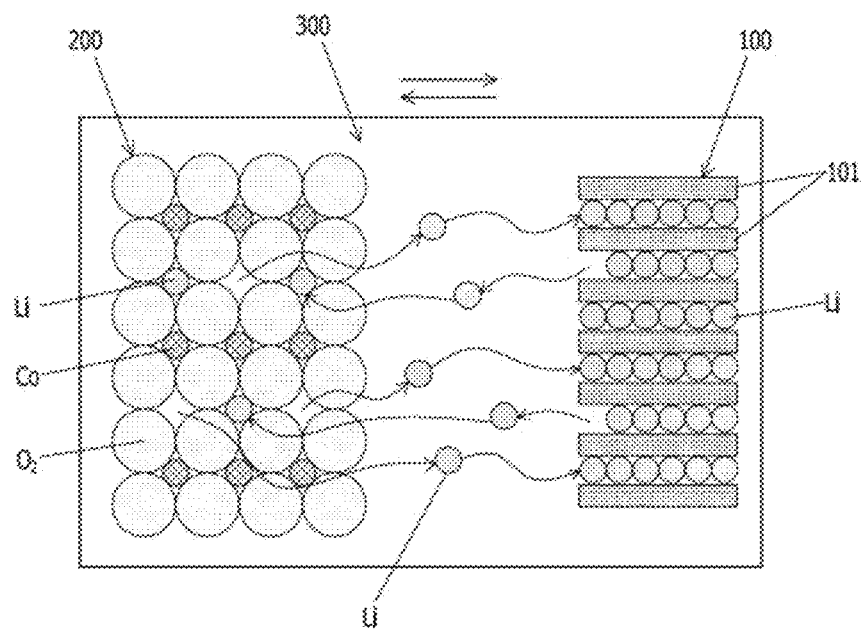
FIG. 1 (prior art) shows a diagram of the charging and discharging processes that take place in a conventional metal ion, and in particular lithium ion, transport cell.
Figure 2:
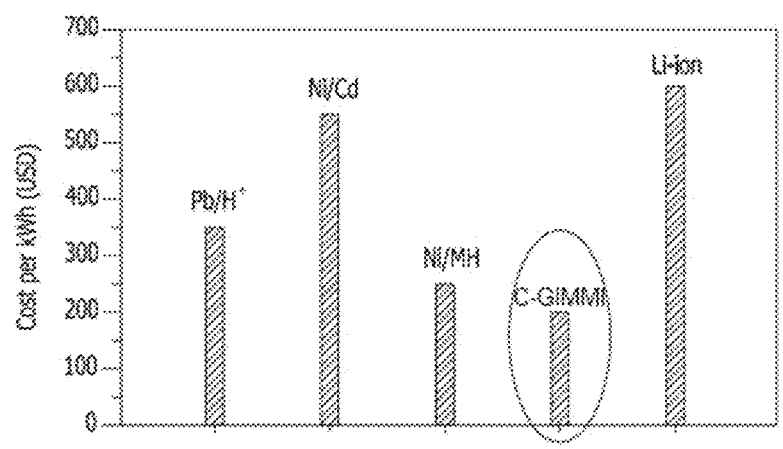
FIG. 2 shows a histogram whose bars indicate approximately, and with estimates relating to 2011, the costs of batteries present on the market compared with one produced with the cell of the invention, indicated with the acronym C-GIMMI (Metal Metal Ion Hybrid Glycol Cell)

With reference to the figures, the rechargeable electrochemical metal ion cell comprises:

a negative electrode (anode) 1 comprising at least a first metal capable of exchanging ions;

a positive electrode (cathode) 2 comprising at least one compound capable of exchanging ions of a second metal different from the first;

an electrolyte system 3 interposed between said negative electrode 1 and said positive electrode 2.

The cathode (positive electrode) 2 can be made of conventional or non-conventional material, as can the anode (negative electrode) 1. The preparation methods of the cathode and of the anode are known to those skilled in the art, as are the methods for assembly of the cell, and for the sake of brevity will not be described herein. However, it must be underlined how the cell described herein advantageously, and in a stable manner, also allows the use of conventional metal supports, such as aluminum, which must instead be avoided in cells containing aqueous electrolytic systems where it is necessary to use carbon supports, such as graphite based sheets or layers.

The anode (negative electrode) 1 comprises at least one metal M1 that is air stable without further protection, and can preferably be a zinc sheet or, alternatively to this latter, titanium compounds, such as lithium titanium oxide or sodium titanium oxide, titanium dioxide and the like, can be used.

The cathode (positive electrode) 2 comprises at least one compound $M2(Mi)O_x$ capable of releasing ions of a second metal, different from that of the anode, and can preferably be a film coated on an electronic conductive support of known type, where Mi indicates the presence of one or more metals different from M1 and from M2.

Compounds of the type $LiM3M4O_x$ or $NaM3M4O_x$ can be used, where M2 is represented respectively by Li or Na and M3 and M4 are metals that can be selected from Mn, Ni, Fe, Co, P or combinations thereof, and even more preferably lithium cobalt oxide ($LiCoO_2$) or lithium iron phosphate ($LiFePO_4$), or alternatively compounds capable of releasing lithium ions, such as $LiMnO_4$, $LiNi_{0.33}Co_{0.33}$, $Mn_{0.33}$, $O_2$, $LiNiO_2$, $LiNi_xCo_yO_2$, $LiNi_xCo_yAl_yO_2$ and the like, or sodium ions such as $NaFePO_4$ can be used as long as the aforesaid materials fall within the interval of stability to oxidation of the glycol-based electrolyte medium.

The electrolyte system (separation medium) 3 is constituted by a substantially solid structure, for example a membrane that retains a glycol-based electrolyte solution.

The membrane is preferably made of cellulose, or alternatively polymer and/or gel membranes, based on Polyethylene oxide (PEO), Polyethylene glycol (PEG), Polyacrylonitrile (PAN) and the like, can be used.

It must be underlined that the use, already described in the literature, of known polyether derivatives, in the production of electrolyte systems is circumscribed to applications substantially different from those proposed herein, both from the point of view of operating specifications of the cells, in terms of operating voltage and response to increasing currents, and with regard to their function in the electrolyte system, the chemical-physical properties and consequent resulting features of the electrolyte system as a whole. In particular, with respect to glycol, polyethers are characterized by lower operating currents and higher operating voltages, not suitable for the applications proposed here.

The electrolyte medium is a glycol-based solution of two salts of the metals contained in the cathode and in the anode, capable of providing ions $M1^{+n}$ and $M2^{+m}$.

There can be used, for example, glycol solutions of salts of a metal M1 included in one of the electrodes, such as hydroxides, chlorides, perchlorates, trifluoromethanesulfonates and similar salts; and salts of another metal M2 included in the other electrode such as hydroxides, chlorides, perchlorates, trifluoromethanesulfonates and similar salts.

Figure 3:
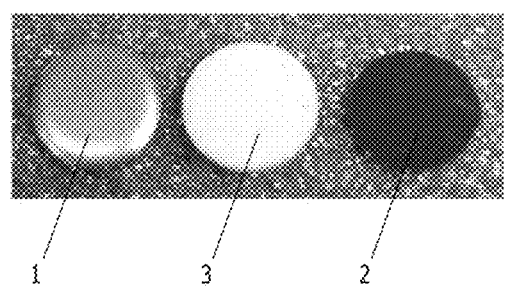
FIG. 3 shows a disassembled electrochemical cell, produced according to the invention.
Figure 4:
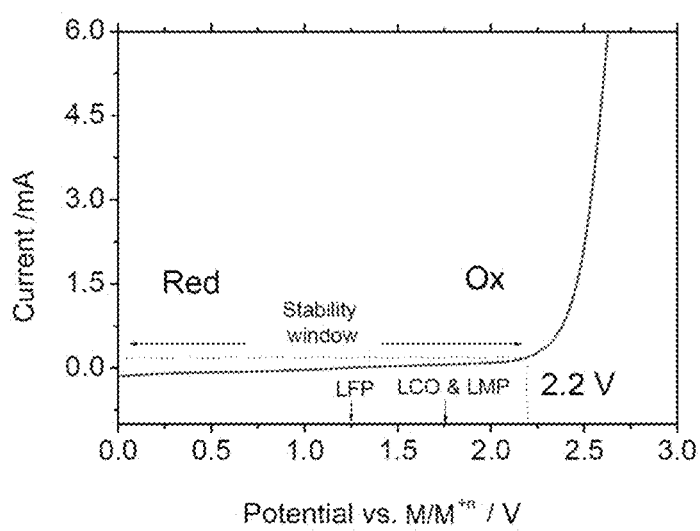
FIG. 4 shows a graph indicating the stability window of the glycol-based electrolyte in a metal ion cell $M/M^{+n}$.

FIG. 3 shows an example of disassembled cell prototype that preferably consists of a metal anode 1, a cathode 2 based on a metal oxide and a nonwoven fabric electrolyte 3 solvated with glycol containing metal ions. The prototype is assembled in discharged solid state, and is charged for a time proportional to the current used. After charging, the prototype supplies a variable voltage for a time proportional to the operational current.

Figure 8:
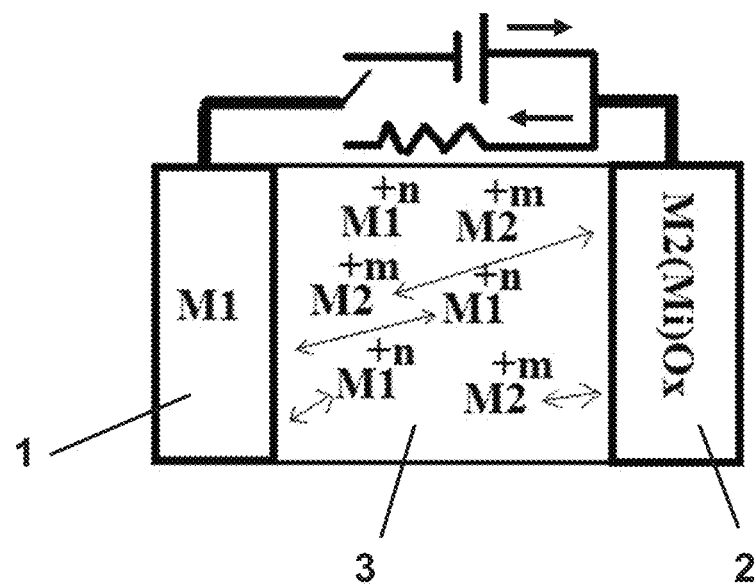
FIG. 8 shows a general scheme of an electrochemical cell according to the invention.

FIG. 8 shows a scheme of an electrochemical cell produced according to the invention that comprises, in a single cell, both the anode side constituted by the anode 1 composed of a metal M1, and the cathode side constituted by the cathode 2 composed of a composite metal oxide $M2(Mi)O_x$.

The electrolyte system 3 is of glycol-based type, and comprises a matrix for containing two different ions mixed with one another $M1^{+n}$ and $M2^{+m}$.

Therefore, in substance the cell is single and can be described briefly as being formed by: metal electrode M1/dissolved salt of the ion $M1^{+n}$-dissolved salt of the ion $M2^{+m}$/electrode $M2(Mi)O_x$.

The metal ion hybrid cell is therefore generally formed by an anode M1, by a cathode $M2(Mi)O_x$ and by an electrolyte system that contains a glycol-based solution of the two electrolyte salts associated therewith, i.e. dissolved salt of the ion $M1^{+n}$ and dissolved salt of the ion $M2^{+m}$. This glycol solution is supported by a matrix of different nature adapted to retain the solution without altering its functionality.

The two ions $M1^{+n}$ and $M2^{+m}$ move in two different directions in the same electrolyte matrix, the ion $M1^{+n}$ during charging moves from the electrolyte system toward the electrode M1 and vice versa during discharging; simultaneously the ion $M2^{+m}$ during discharging moves from the electrolyte system toward the electrode $M2(Mi)O_x$ and vice versa during charging.

Some examples of electrode reactions associated with preferred embodiments of the present invention are described below. These embodiments must not be interpreted as limiting the scope of the present invention.

EXAMPLE 1

Electrochemical cell formed by an anode constituted by an aluminum sheet, an electrolyte constituted by a nonwoven membrane that retains a glycol-based solution of aluminum nitrate and lithium nitrate and by a cathode comprising a lithium iron phosphate oxide film on an electronic conductive support.

Cell Configuration:
Al/nonwoven-glycol, $Al(NO_3)_3$ 1 m, $LiNO_3$ 1 m/LiFePO$_4$
Electrochemical Process:
(−)

$$Al(NO_3)_3 + 3e^- = Al + 3(NO_3)^-\ E_- = -1.66\ V\ vs.\ SHE$$

(+)

$$LiFePO_4 = FePO_4 + e^- + Li^+\ E_+ = 0.44\ V\ vs.\ SHE$$

Characteristics
E=+2.1 V
Specific capacity=170 mAhg$^{-1}$ (vs. LiFePO$_4$)
Energy density=357 Wh kg$^{-1}$

EXAMPLE 2

Electrochemical cell formed by an anode constituted by a zinc sheet, an electrolyte constituted by a cellulose membrane that retains a glycol-based solution of zinc sulfate and lithium sulfate and by a cathode comprising a lithium iron phosphate oxide film on an electronic conductive support.

Cell Configuration:
Zn/Cellulose-glycol, $ZnSO_4$ 1 m, $Li_2SO_4$ 1 m/LiFePO$_4$
Electrochemical Process:
(−)

$$ZnSO_4 + 2e^- = Zn + SO_4^{2-}\ E_- = -0.76\ V\ vs.\ SHE$$

(+)

$$LiFePO_4 = FePO_4 + e^- + Li^+\ E_+ = 0.44\ V\ vs.\ SHE$$

Characteristics
E=+1.2 V
Specific capacity=170 mAhg$^{-1}$ (vs. LiFePO$_4$)
Energy density=200 Wh kg$^{-1}$

EXAMPLE 3

Cell formed by an anode constituted by a zinc sheet, an electrolyte constituted by a cellulose membrane that retains a glycol-based solution of zinc sulfate and lithium sulfate and by a cathode comprising a lithium cobalt oxide film on an electronic conductive support.

Cell Configuration:
Zn/Cellulose-glycol, $ZnSO_4$ 1 m, $Li_2SO_4$ 1 m/LiCoO$_2$
Electrochemical Process:
(−)

$$ZnSO_4 + 2e^- = Zn + SO_4^{2-}\ E_- = -0.76\ V\ vs.\ SHE$$

(+)

$$LiCoO_2 = Li_{(1-x)}CoO_2 + xe^- + xLi^+\ E_+ = 0.94\ V\ vs.\ SHE$$

Characteristics
E=+1.7 V
Specific capacity=170 mAhg$^{-1}$ (x=0.6 vs. LiCoO$_2$)
Energy density=289 Wh kg$^{-1}$

EXAMPLE 4

Electrochemical cell formed by an anode constituted by a zinc sheet, an electrolyte constituted by a cellulose membrane that retains a glycol-based solution of zinc sulfate and sodium sulfate and by a cathode comprising a sodium iron phosphate oxide film on an electronic conductive support.

Cell Configuration:
Zn/Cellulose-glycol, $ZnSO_4$ 1 m, $Na_2SO_4$ 1 m/NaFePO$_4$
Electrochemical Process:
(−)

$$ZnSO_4 + 2e^- = Zn + SO_4^{2-}\ E_- = -0.76\ V\ vs.\ SHE$$

(+)

$$NaFePO_4 = FePO_4 + e^- + Na^+\ E_+ = 0.44\ V\ vs.\ SHE$$

Figure 5:
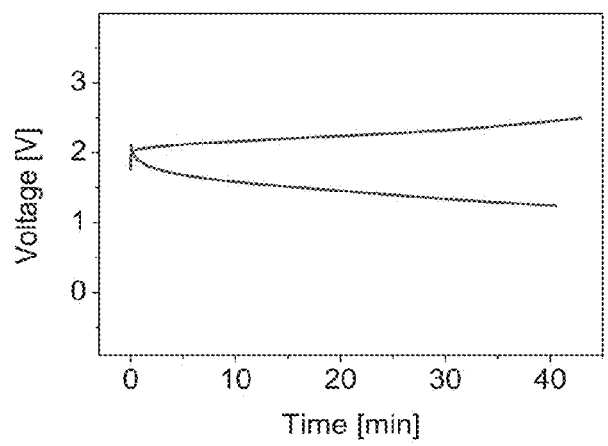
FIG. 5 shows a diagram of experimental results obtained with a laboratory prototype, as indicated in Example 1 set forth below, of a battery according to the invention performed at a room temperature of 25° C.

Characteristics
E=+1.2 V
Specific capacity=154 mAhg$^{-1}$ (vs. NaFePO$_4$)
Energy density=185 Wh kg$^{-1}$
Some Results FIG. 5 shows an experimental result obtained on laboratory prototypes of the battery with cell configuration Al/nonwoven-glycol, $Al(NO_3)_3$ 1 m, $LiNO_3$ 1 m/LiFePO$_4$ charged and discharged for approximately 45 minutes, with a mean discharge voltage of 1.8V.

Figure 6:
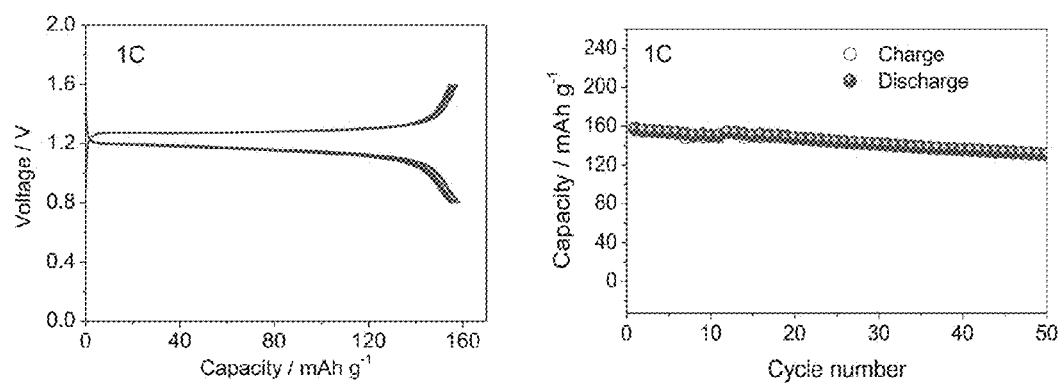
FIG. 6 shows some diagrams of experimental results obtained on laboratory prototypes of a battery according to the invention as indicated in Example 2 set forth below, performed at a room temperature of 25° C.

FIG. 6 shows some experimental results obtained on laboratory prototypes of the battery with cell configuration Zn/glycol-based electrolyte, $ZnSO_4$ 1 m, $Li_2SO_4$ 1 m/LiFePO$_4$ studied at a current of 1 C (complete discharge/charge in 1 hour) at room temperature. In accordance with the electrochemical process thereof, the battery operates with a mean voltage of 1.2 V and a specific capacity of around 160 mAh g$^{-1}$.

Figure 7:
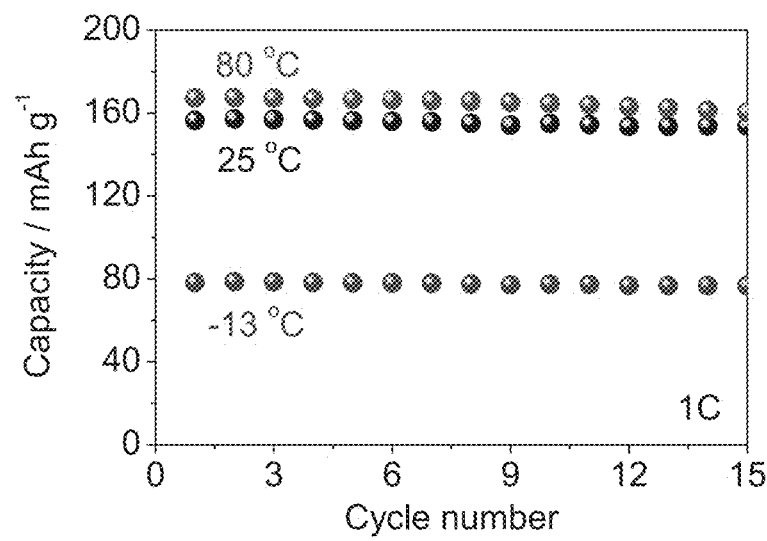
FIG. 7 shows some diagrams of experimental results obtained on laboratory prototypes of a battery according to the invention, as indicated in Example 2 set forth below, performed at a temperature ranging from −13° C. to 80° C., showing a possible increase of the thermal stability window of the cell.

FIG. 7 shows some experimental results obtained on laboratory prototypes of the battery with cell configuration Zn/glycol-based electrolyte, ZnSO$_4$ 1 m, Li$_2$SO$_4$ 1 m/LiFePO$_4$ studied at a current of 1 C (complete discharge/charge in 1 hour) at a temperature variable from −13° C. to 80° C. The test indicates the wide thermal stability window of the glycol-based electrolyte and of the cell that uses it.

FURTHER EXAMPLES

LiCoO$_2$ can be used in a solution containing Li$^+$ and Al$^{+3}$ (for example nitrates) using Al metal as anode to produce the following cell:
Al/Al(NO$_3$)$_3$: LiNO$_3$/LiCoO$_2$
LiFePO$_4$ can be used in a solution containing Li$^+$ and Cu$^{+2}$ (for example sulfates and nitrates) using Cu metal as anode to produce the following cell:
Cu/CuSO$_4$, LiNO$_3$/LiFePO$_4$
NaFePO$_4$ can be used in a solution containing Na$^+$ and Ni$^{+2}$ (for example acetates and nitrates) using Ni metal as anode to produce the following cell:
Ni/Ni(Ac)$_2$, NaNO$_3$/NaFePO$_4$

The invention claimed is:

1. A rechargeable electrochemical metal ion cell comprising:
a negative electrode (anode) (1);
a positive electrode (cathode) (2);
an electrolyte system (3) interposed between said negative electrode and said positive electrode,
wherein:
said negative electrode (1) comprises at least one metal capable of releasing and accepting metal ions;
said positive electrode (2) comprises at least one compound capable of releasing and accepting metal ions different from those of the negative electrode (1);
said electrolyte system (3) comprises:
a glycol-based electrolyte solution containing a salt of a metal included in the negative electrode (1) and a salt of a metal included in the positive electrode (2);
a matrix of solid and/or polymer and/or gel type adapted to retain said electrolyte solution,
where two reversible reactions take place simultaneously in said cell: a reversible deposition and dissolution process of ions of a metal included in the negative electrode (1) takes place in said negative electrode and a reversible ion exchange process of a metal included in the positive electrode (2) takes place in said positive electrode and said metals are different from one another.

2. The electrochemical cell according to claim 1, wherein the negative electrode (1) comprises at least one air stable metal without further protection.

3. The electrochemical cell according to claim 1, wherein the negative electrode (1) comprises a sheet of zinc or of titanium compounds.

4. The electrochemical cell according to claim 1, wherein the positive electrode (2) comprises a film of a compound based on metals coated on an electronic conductive support.

5. The electrochemical cell according to claim 1, wherein the positive electrode (2) comprises compounds capable of releasing lithium or sodium ions, as long as the aforesaid compounds fall within the interval of stability to oxidation of the glycol-based electrolyte medium.

6. The electrochemical cell according to claim 1, wherein said matrix comprises a cellulose membrane or a nonwoven membrane, polyethylene, polypropylene, or a gel membrane based on Polyethylene oxide (PEO), Polyethylene glycol (PEG), Polyacrylonitrile (PAN), that retains said glycol-based electrolyte solution.

7. The electrochemical cell according to claim 1, wherein:
said negative electrode (1) comprises an aluminum sheet;
said positive electrode (2) comprises a lithium iron phosphate film on an electronic conductive support;
said electrolyte system (3) comprises a solid and porous membrane made of cellulose, polyethylene, polypropylene or nonwoven that retains a glycol-based solution of aluminum salt and lithium salt.

8. The electrochemical cell according to claim 1, wherein:
said negative electrode (1) comprises a zinc sheet;
said positive electrode (2) comprises a lithium iron phosphate film on an electronic conductive support;
said electrolyte system (3) comprises a solid and porous cellulose, polyethylene, polypropylene or nonwoven membrane that retains a glycol-based solution of zinc sulfate and lithium sulfate.

9. The electrochemical cell according to claim 1, wherein:
said negative electrode (1) comprises a zinc sheet;
said positive electrode (2) comprises a lithium cobalt oxide film on an electronic conductive support;
said electrolyte system (3) comprises a solid and porous cellulose, polyethylene, polypropylene or nonwoven membrane that retains a glycol-based solution of zinc salt and lithium salt.

10. The electrochemical cell according to claim 1, wherein:
said negative electrode (1) comprises an aluminum sheet;
said positive electrode (2) comprises a lithium cobalt oxide film on an electronic conductive support;
said electrolyte system (3) comprises a solid and porous cellulose, polyethylene, polypropylene or nonwoven membrane that retains a glycol-based solution of aluminum salt and lithium salt.

11. The electrochemical cell according to claim 1, wherein:
said negative electrode (1) comprises a zinc sheet;
said positive electrode (2) comprises a sodium iron phosphate film on an electronic conductive support;
said electrolyte system (3) comprises a solid and porous cellulose, polyethylene, polypropylene or nonwoven membrane that retains a glycol-based solution of zinc salt and sodium salt.

12. The electrochemical cell according to claim 1, wherein:
said negative electrode (1) comprises an aluminum sheet;
said positive electrode (2) comprises a sodium iron phosphate film on an electronic conductive support;
said electrolyte system (3) comprises a solid and porous cellulose, polyethylene, polypropylene or nonwoven membrane that retains a glycol-based solution of aluminum salt and sodium salt.

13. An electrical energy accumulator comprising at least one electrochemical cell according to claim 1.

14. An electrical energy accumulator comprising at least one electrochemical cell according to claim 2.

15. An electrical energy accumulator comprising at least one electrochemical cell according to claim 3.

16. An electrical energy accumulator comprising at least one electrochemical cell according to claim 4.

17. An electrical energy accumulator comprising at least one electrochemical cell according to claim 5.

18. An electrical energy accumulator comprising at least one electrochemical cell according to claim 6.

19. An electrical energy accumulator comprising at least one electrochemical cell according to claim 7.

20. An electrical energy accumulator comprising at least one electrochemical cell according to claim 8.

\* \* \* \* \*